United States Patent [19]

Bowerman

[11] Patent Number: 5,073,417
[45] Date of Patent: Dec. 17, 1991

[54] VEHICLE ORNAMENT MOUNTING APPARATUS

[76] Inventor: Stanley C. Bowerman, 2914 S. Orleans Ave., West Allis, Wis. 53227

[21] Appl. No.: 605,888

[22] Filed: Oct. 30, 1990

[51] Int. Cl.⁵ .............................................. B60R 13/00
[52] U.S. Cl. .................... 428/31; 248/288.3; 248/551
[58] Field of Search ............... 248/288.3, 288.5, 900, 248/548, 551, 474, 482, 483, 160; 428/31; 280/762, 727; 40/541

[56] References Cited

U.S. PATENT DOCUMENTS

| | | | |
|---|---|---|---|
| 883,811 | 4/1908 | Kraus | 248/160 |
| 3,813,113 | 5/1974 | Burnham | 280/762 |
| 3,968,977 | 7/1976 | Wilfert | 280/727 |
| 4,037,229 | 7/1977 | Dunk | 248/288.3 X |
| 4,067,528 | 1/1978 | Motting et al. | 403/25 |
| 4,349,591 | 9/1982 | Kanamori | 280/727 X |
| 4,560,597 | 12/1985 | Kanamori | 280/727 |
| 4,783,352 | 11/1988 | Kaiser, Jr. | 428/31 |
| 4,913,941 | 4/1990 | Tedrahn | 280/727 |
| 4,974,802 | 12/1990 | Hendren | 248/288.5 X |

*Primary Examiner*—Ramon O. Ramirez
*Attorney, Agent, or Firm*—Quarles & Brady

[57] ABSTRACT

An ornament is attached to the hood of a motor vehicle by an assembly which includes a bracket coupled to the hood and having an aperture formed by a concave surface of the bracket. A hemispherical or spherical body is within the aperture of the bracket with the surface of the body abutting the concave surface of the bracket. The body being of a size which prevents it from passing entirely through the aperture. A retainer is attached to the bracket and has a spherically concave depression in a surface that faces bracket. A ball is held within an aperture in the body and is biased against the indentation in the retainer in a manner that permits the body to rotate against the bracket.

15 Claims, 1 Drawing Sheet

VEHICLE ORNAMENT MOUNTING APPARATUS

BACKGROUND OF THE INVENTION

The present invention relates to devices for attaching ornaments to the body of a vehicle, and more particularly to such devices which allow the ornament to pivot with respect to the hood when struck by an object.

Ornaments for motor vehicles can be fixedly attached to the hood. However this attachment technique has a drawback that when the hood ornament was struck by an object, the force was often great enough to break the ornament. To solve this problem, many hood ornaments today are attached by a mechanism which permits the ornament to pivot in a mounting when struck by unusual force. This allows the hood ornament assembly to yield under the striking force rather than break.

A common technique for pivotally mounting ornaments on motor vehicles involves attaching the hood ornament to one end of a spring which passes through an opening in the hood. The other end of the spring is fastened to a bracket on the under side of the hood. The spring remains in tension holding the ornament against the vehicle hood. Upon being struck by an object, the elasticity of the spring allows the ornament to pivot against the hood of the car. When the force is removed, the tension on the spring may automatically bring the ornament to its normal upright position. Alternatively, the ornament may remain against the hood of the vehicle until manually placed in its upright position.

Hood ornaments, especially those from expensive motor vehicles, are prized objects for thieves and vandals. The spring-held ornaments can be quickly removed from the vehicle by pulling the ornament upward to expose a portion of the spring, which then is cut to free the ornament.

SUMMARY OF THE INVENTION

A mechanism for attaching an ornament to a vehicle includes a mounting bracket that is adapted to be coupled to the body of the vehicle. The bracket has an aperture therethrough which is formed by a first concave surface. Preferably, the first concave surface is hemispherical so as to form an opening of the aperture toward the outside of the vehicle body that is smaller than an aperture opening on the inward side of the body.

A rotatable assembly, having a convex surface, is within the aperture in the bracket. A post is provided on the assembly to which the ornament can be attached. A retainer is coupled to the mount and has a partially spherical second concave surface which engages and holds the rotatable assembly within the bracket.

In one embodiment of the invention, the rotatable assembly includes a ball held within an open aperture in the sphere. A spring within the sphere aperture biases the ball outward and against the partially spherical second concave surface.

An object of the present invention is to provide a mechanism for attaching a hood ornament to a vehicle.

Another object is to provide such a mechanism which allows the ornament to move rather than break when an unusual force is exerted on the ornament.

A further object is to provide such a yieldable mechanism in which it is difficult for vandals and thieves to remove the ornament.

DETAILED DESCRIPTION OF THE INVENTION

Figure 1:
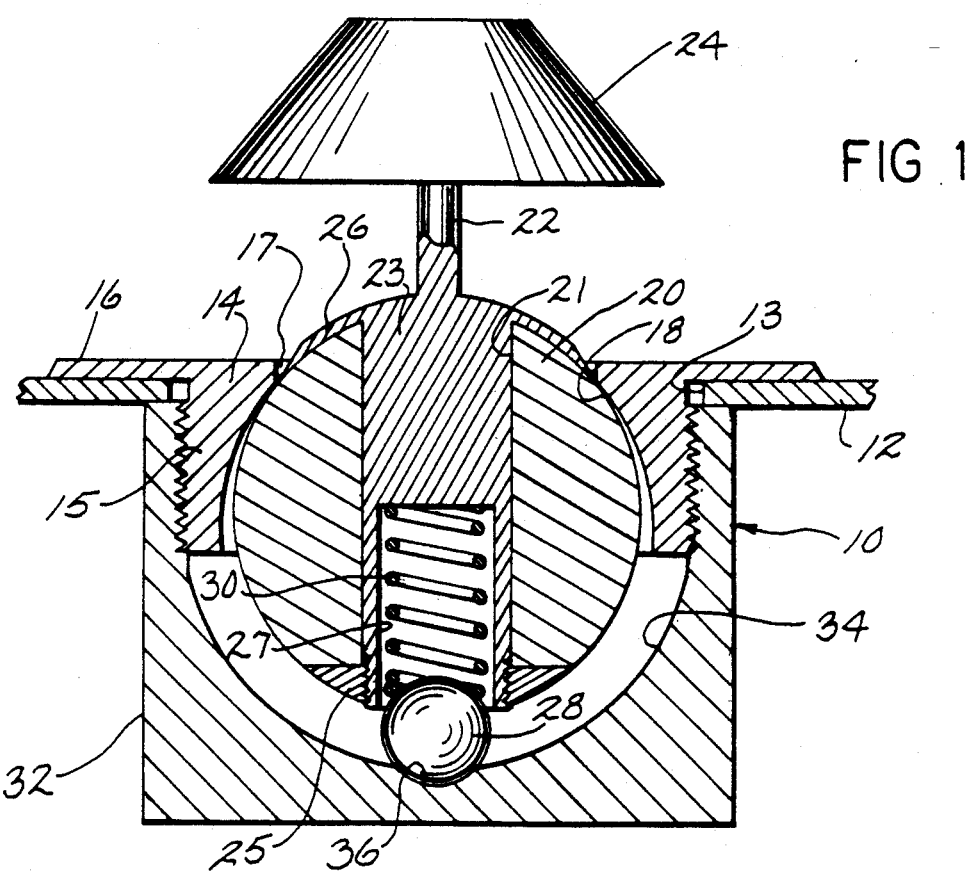
FIG. 1 is a cross-sectional view of one embodiment of a hood ornament mounting apparatus according to the present invention.

With initial reference to FIG. 1, a vehicle ornament mounting assembly, generally designated 10, is mounted through a circular hole 13 in vehicle hood 12. Specifically, a chrome plated metallic bracket 14 has a cylindrical portion 15 which passes through hole 13. Threads are cut in the external surface of the bracket's cylindrical portion 15. One end of the bracket 14 has an annular flange 16 abutting the upper surface of hood 12 preventing the bracket from passing completely through the hole 13. The bracket 14 has a centrally located aperture which has a truncated hemispherical concave surface 18. A circular opening 17 of the aperture at the flange side of the bracket is smaller than a circular aperture opening at the opposite side of the bracket.

A metal or plastic sphere 20 is located within the aperture in the bracket 14. The hemispherical concave surface 18 and the sphere 20 have substantially the same diameter so as to closely fit together. A circular aperture 21 extends through the sphere 20.

An ornament 24 has a post 22 extending therefrom. The post has a projection 23 which extends through the aperture 21 in the sphere 20. A flange 26 projects outwardly from the junction of post 22 and projection 23 and is curved to conform with the surface of the sphere 20. A nut 25 is threaded onto the remote end of the projection 23 and abuts a flattened portion of the sphere 20. The remote end of the projection 23 also has an aperture 27 therein. A ball 28 is partially positioned within this aperture 27. A spring 30 within the aperture 27 biases the ball 28 by applying a force which tends to push the ball out of the aperture 27.

A retainer cup 32 has internal threads which engage the external threads around the cylindrical portion 15 of bracket 14. When the retainer cup 32 is fully threaded on to bracket 14, the vehicle hood 12 is clamped between the bracket 14 and the retainer cup 32 attaching the ornament mounting assembly 10 to the vehicle hood. The retainer cup 32 has a hemispherically concave surface 34 against which the ball 28 abuts. Although the surface 34 in the exemplary device is hemispherically concave, the surface may be curved less than a complete hemisphere. An indentation 36 in this surface 34 provides a nest for the ball 28 when the hood ornament 24 is in its normal upright position, as illustrated.

When the ornament 24 in FIG. 1 is struck by an object, the force of the blow causes the sphere 20 to rotate within the mounting assembly 10. As the sphere 20 rotates, ball 28 rides out of the indentation 36 across the hemispherically concave surface 34, causing a slight compression of spring 30. This rotational movement of the sphere enables the hood ornament 24 to pivot under the force of the blow. The force exerted on the ornament must exceed a given level before the force from spring 30 is overcome so that the ball can ride out of the indentation 36. This level of force is great enough so that normal forces exerted on the ornament during driving will not cause pivoting, yet less than the force which would break the ornament 24 or post 22.

After the hood ornament 24 has been pivoted in this fashion, the user of the vehicle may grab the hood ornament and pivot it back into its upright position. This action causes the ball 28 to roll against the hemispherical concave surface 34 of retainer cup 32 until it once again nests within indentation 36.

Any attempt by a vandal to remove the hood ornament 24 by pulling the sphere 20 through the hood aperture 13 will be prevented, as the opening 17 in the bracket 14 is smaller than the diameter of sphere 20. As a consequence, the present hood ornament mounting assembly 10 permits the ornament to yield under the force of objects striking the ornament, while preventing easy removal of the hood ornament from the vehicle without destroying the ornament or opening the hood.

Figure 2:
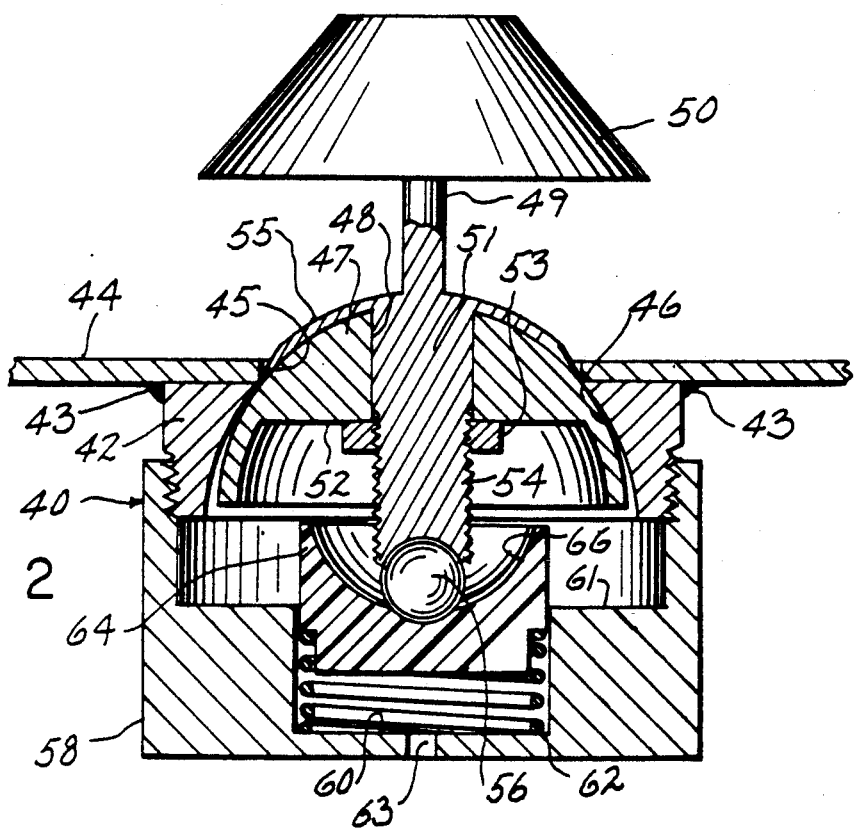
FIG. 2 is another embodiment of the present invention.

FIG. 2 illustrates an alternative embodiment of a hood ornament mounting assembly 40 according to the present invention. An annular bracket 42 is welded at points 43 to the underside of the vehicle hood 44. An aperture 45 through the vehicle hood is aligned with a central opening formed by an inner surface 46 of the bracket 42. The inner surface 46 is hemispherically concave so that the opening in the bracket 42 which is adjacent the hood 44 has a smaller diameter than the opening at the opposite side of bracket 42.

A hemisphere 47 is located within the annular bracket 42 and has an outer diameter approximately equal to the diameter of the hemispherically concave surface 46 of the bracket. The curved surface of the hemisphere extends through the aperture 45 in the vehicle hood 44. A recess 52 is cut in the flat surface of hemisphere 48. An aperture 48 extends through the hemisphere 47 opening into recess 52.

Ornament 50 has a post 49 coupled to a projection 51 that extends through aperture 48 in the hemisphere. A curved flange 55 which conforms to the curved surface of the hemisphere 47, extends from the junction of the post 49 and projection 51. A nut 53 is threaded onto the remote end of the projection 51 and abuts the hemisphere in its recess 52. The remote end of the projection has a concave indentation which receives a ball 56.

The external circumferential surface of bracket 42 has threads cut therein which engage internal threads cut in a retainer cup 58. A well 60 is formed in the bottom inner surface 61 of the retainer cup 58. An aperture 63 extends through the retainer cup 58 at the bottom of well 60, thereby providing a drain for any water that flows between the hemisphere 47 and bracket 42. A cylindrical pivot block 64 is received within well 60 and biased outwardly therefrom by compression spring 62 located between one end of pivot block 64 and the bottom of the well 60. The biasing force of spring 62 forces a hemispherically concave indentation 66 in the other end of the pivot block 64 against the ball 56. The force of the spring holds the ball in contact with both the projection 51 of hemisphere 47 and the pivot block 64.

When the ornament 50 is struck by an object, the force of the blow will cause the hemisphere 48 to rotate within the bracket 42. This action allows the ornament to yield under the force of the blow rather than being bent or broken off. As the hemisphere 47 rotates, ball 56 will ride against the concave hemispherical surface 66 of the pivot block. Thereafter, the user can grasp the ornament 50 and move it into an upright position. The force of the spring 62 increases the friction exerted on the ball by the hemisphere 47 and the pivot block 64. This force maintains the ornament in an upright position under normal circumstances requiring an unusually large force to be exerted against the ornament before rotation of hemisphere 47 occurs. Thus, under normal driving conditions, the force of air against the ornament 50 will not produce significant movement.

The present invention has been described in the context of two exemplary embodiments. It will be appreciated that other variations of the ornament design fall within the inventive concept being claimed herein. For example, the upper bracket 14 in FIG. 1, which does not require welding to the hood, could be used in place of bracket 42 in FIG. 2.

I claim:

1. A mechanism for attaching an ornament to a vehicle comprising:
   a bracket for coupling to the vehicle and having a first aperture therethrough;
   an assembly rotatably within the first aperture and having a means extending outwardly from the bracket for attaching the ornament thereto; and
   a retainer attached to and captivating said assembly within the aperture of said bracket, said retainer having a partially spherical second concave surface engaging said assembly.

2. An ornament assembly for a vehicle comprising:
   an ornament;
   a bracket for coupling to the vehicle and having a first aperture therethrough;
   a member having a second aperture therethrough, and extending rotatably into the first aperture;
   means for attaching said ornament to said member, and having a portion extending through the second aperture;
   a retainer means, attached to said bracket, for holding said member within the first aperture, said retainer means having a partially spherical concave surface; and
   a ball engaging the concave surface of said retainer means and the portion of said means for attaching.

3. The ornament assembly as recited in claim 2 wherein said member has a curved convex surface that abuts said bracket.

4. The ornament assembly as recited in claim 2 wherein said member has a substantially spherical shape.

5. The ornament assembly as recited in claim 2 wherein said member has a substantially hemispherical surface that abuts said bracket.

6. The ornament assembly as recited in claim 2 wherein the portion of said means for attaching has a third aperture therein and said ball being located partially within the third aperture, and a spring within the third aperture biasing said ball outwardly against the concave surface of said retainer means.

7. The ornament assembly as recited in claim 2 wherein said retainer means comprises:
   a retainer cup with a cavity that opens toward said bracket;
   a pivot block with the concave surface that said ball abuts; and
   a spring biasing said pivot block with respect to said retainer cup to maintain said pivot block in abutment with said ball.

8. An ornament assembly for a motor vehicle body comprising:
   an ornament;

an bracket for engaging the motor vehicle body, and having an aperture therethrough formed by a concave surface;

a rotatable element having a convex surface that engages the concave surface of said bracket;

means for attaching said ornament to said rotatable element;

a retainer attached to said bracket and having a concave surface; and a ball rotatably held in an aperture of said means for attaching and abutting the concave surface of said retainer.

9. The assembly as recited in claim 8 further comprising a spring means located in the aperture in said means for attaching, and biasing said ball outward from the aperture.

10. The assembly as recited in claim 8 wherein said rotatable element has a substantially spherical shape.

11. The assembly as recited in claim 8 wherein said bracket includes a flange which abuts a surface of the motor vehicle body; and a projection extending from the flange through a hole in the motor vehicle body.

12. The assembly as recited in claim 11 wherein said retainer is attached to the projection and abuts another surface of the motor vehicle body.

13. The assembly as recited in claim 8 wherein the convex surface of said rotatable element has a partial spherical shape.

14. The assembly as recited in claim 8 wherein said retainer includes:

a retainer cup attached to said bracket;

a pivot block having the concave surface abutted by said ball; and a spring biasing said pivot block with respect to said retainer cup to maintain said pivot block in abutment with said ball.

15. The assembly as recited in claim 8 wherein:

said rotatable element has a substantially hemispherical surface; and said retainer includes a retainer cup, a pivot block within said retainer cup and having the concave surface abutted by said ball, and a spring biasing said pivot block with respect to said retainer cup.

* * * * *